(12) United States Patent
Hindle et al.

(10) Patent No.: US 6,964,463 B1
(45) Date of Patent: Nov. 15, 2005

(54) ENCLOSURE MEANS FOR HOLDING AN ELECTRICAL DEVICE HAVING A LIMITED ACCESSING CONSTRUCTION WITH DUAL PANELS FOR SAFETY

(75) Inventors: William A. Hindle, Everittstown, NJ (US); Carlos A. Infante, Quakertown, PA (US)

(73) Assignee: HindlePower, Inc., Easton, PA (US)

( * ) Notice: Subject to any disclaimer, the term of this patent is extended or adjusted under 35 U.S.C. 154(b) by 114 days.

(21) Appl. No.: 10/439,473

(22) Filed: May 16, 2003

(51) Int. Cl.$^7$ .............................................. A47B 81/00
(52) U.S. Cl. ..................................................... 312/291
(58) Field of Search ............................... 312/291, 292, 312/326, 257.1, 329, 114

(56) References Cited

U.S. PATENT DOCUMENTS

| | | | | |
|---|---|---|---|---|
| 2,040,634 | A | * | 5/1936 | Sekyra ........................ 62/382 |
| 2,130,617 | A | * | 9/1938 | Dockham .................... 312/291 |
| 2,135,878 | A | * | 11/1938 | Sekyra, Sr. .................. 62/252 |
| 2,575,530 | A | * | 11/1951 | Reid ........................... 312/225 |
| 3,367,730 | A | * | 2/1968 | Andrews et al. ............ 312/204 |
| 4,320,933 | A | * | 3/1982 | Felix et al. .................. 312/291 |
| 4,519,657 | A | | 5/1985 | Jensen |
| 4,973,109 | A | * | 11/1990 | Diedrich ..................... 312/114 |
| D327,055 | S | | 6/1992 | Derbyshire |
| 5,143,430 | A | * | 9/1992 | Craven et al. ............... 312/291 |
| 5,378,058 | A | | 1/1995 | Tessmer |
| 5,568,355 | A | | 10/1996 | Verding et al. |
| D380,198 | S | | 6/1997 | Clark et al. |
| 5,716,116 | A | | 2/1998 | Carlson et al. |
| 5,822,180 | A | | 10/1998 | Deschamps et al. |
| 6,019,051 | A | | 2/2000 | Schairbaum |
| 6,085,431 | A | | 7/2000 | Schairbaum |
| 6,229,707 | B1 | | 5/2001 | Keenan et al. |
| 6,293,962 | B1 | | 9/2001 | Bishay |
| 6,329,907 | B1 | | 12/2001 | Uischner et al. |
| 6,331,761 | B1 | | 12/2001 | Kumar et al. |
| 6,361,130 | B1 | * | 3/2002 | Kardy ......................... 312/245 |

FOREIGN PATENT DOCUMENTS

EP 348130 * 12/1989

* cited by examiner

Primary Examiner—James O. Hansen
(74) Attorney, Agent, or Firm—Sperry, Zoda & Kane

(57) ABSTRACT

Enclosure for holding an electrical device with dual access panels for safely limiting access to the device while allowing maintenance thereof. The housing defines an access opening with a limited accessing construction thereover. Interior and exterior panels are included each movable to be closed and opened. The interior panel is preferably transparent to facilitate viewing therethrough. The exterior panel is preferably metal and is hinged to the housing for movement between closed and opened positions. Individual accessing apertures can be defined in the interior and exterior panels to allow localized access by servicing personnel. Specific positioning of the access opening in the interior and/or exterior panels provides access to limited areas of the electrical device within the housing and prevents access to other areas for safety. The interior panel can have indicia imprinted thereon to facilitate servicing.

18 Claims, 5 Drawing Sheets

AC INPUT BREAKER        DC OUTPUT BREAKER

QUICK OPERATION

Startup

▲ Turn on the DC breaker, labeled "DC OUTPUT BREAKER"
▲ Turn on the AC breaker, labeled "AC INPUT BREAKER"

Changing between Float and Equalize Modes

▲ Press the [■] key to toggle from Float mode to Equalize mode. Press again to toggle back to Float. The green or yellow indicator identifies the current mode.

Settings

- Float Voltage
- Equalize Voltage
- Equalize Timer
- High DC Voltage
- Low DC Voltage
- Current limit ▲ Press the [■] key. The DC VOLTS and FLOAT indicators light, and the digital display flashes the present float voltage setting.

▲ Press the [▲] or [▼] key until the digital display indicates the desired FLOAT voltage.

▲ Press the [■] key to save the new setting internally.

▲ The EDIT sequence advances to the equalize voltage as shown by the front panel indicators.

Repeat the above steps until you have set all parameters.

*For installation instructions, see section 1 in the manual*

*To learn how to use the equalize timers, see sections 2.2.4 and 2.3.3*

*For details on setting parameters, see section 2.3*

*If you don't press any key for 25 seconds, the AT10.1 charger resumes normal operation automatically*

ERROR CODES

Below is a list of the error codes.
See section 3.2 of the User's Manual for a full explanation of each error code.

| Error Code | Explanation |
|---|---|
| E 01 | R2 Rating resistor is open or defective |
| E 02 | Short circuit on output |
| E 03 | HVDC (High Voltage DC) Shutdown has occurred |
| E 04 | Internal memory failure |
| E 05 | Not used |
| E 06 | Failure in Remote Sensing wiring |
| E 07 | DC breaker is open, or internal or external output wiring is defective |
| E 08 | Defective temperature compensation probe |
| E 09 | Misadjusted current limit |
| E 10 | Open Internal feedback loop |
| A 01 | Charger in Manual Equalize for more than 24 hours |
| A 02 | Equalize Mode is inhibited |
| A 03 | Battery problem detected |

SAFETY SHIELD PART No. FB5003-00 REV. 01

ENCLOSURE MEANS FOR HOLDING AN ELECTRICAL DEVICE HAVING A LIMITED ACCESSING CONSTRUCTION WITH DUAL PANELS FOR SAFETY

BACKGROUND OF THE INVENTION

1. Field of the Invention

The present invention deals with the field of devices for holding electrical components. Most electrical devices such as battery chargers or other similar devices require an exterior housing to limit unwanted physical contact with dangerous components contained in the electrical device. Some of these components have exposed wiring which expose servicing or maintenance personnel to high voltage or high current in a dangerous manner. Access, however, to such electrical devices houses within such enclosures is important for the purpose of allowing maintenance servicing and other similar activities but even when such experienced personnel are performing these activities danger exists due to the exposed electrical components. The present invention provides a manner for limiting access to those areas which present unusual danger to maintenance personnel while at the same time allowing access to those areas that need to be available to perform such servicing activities.

2. Description of the Prior Art

Numerous patents have been granted on various types of access opening securement and covering mechanisms for various types of electrical and/or other equipment some of which may include a movable door configuration such as shown in U.S. Pat. No. 4,519,657 patented to H. Jensen on May 28, 1985 and assigned to Common Sense Products Pty. Ltd. on a "Multiple Service Unit"; and United States Design Patent No. D327,055 patented Jun. 16, 1992 to J. A. Derbyshire and assigned to British Telecommunication public limited company on a "Network Interface Access Cover For Telecommunication Service"; and U.S. Pat. No. 5,378,058 patented Jan. 3, 1995 to W. D. Tessmer and assigned to Tesco Controls, Inc. on a "Service Pedestal"; and U.S. Pat. No. 5,568,355 patented Oct. 22, 1996 to M. Verding et al and assigned to Siemens Aktiengesellschaft on "PCB Housing With Two-Part Terminal-Access Cover"; and U.S. Pat. No. 5,716,116 patented Feb. 10, 1998 to B. J. Carlson et al and assigned to Metro Industries, Inc. on a "Utility Cabinet And Modular Storage And Support Assembly Using The Utility Cabinet"; and United States Design Patent No. D380,198 patented Jun. 24, 1997 to W. J. Clark et al on a "Housing For GFCI With Load Center, Disconnect, And Transparent Access Cover"; and U.S. Pat. No. 5,822,180 patented Oct. 13, 1998 to J. C. Deschamps et al and assigned to Schneider Electric SA on "Enclosure, For Electrical Devices"; and U.S. Pat. No. 6,019,051 patented Feb. 1, 2000 to E. C. Schairbaum and assigned to Nova Solutions, Inc. on a "Liner Sleeve For Monitor Viewing Aperture In A Work Station"; and U.S. Pat. No. 6,085,431 patented Jul. 11, 2000 to E. C. Schairbaum and assigned to Nova Solutions, Inc. on a "Preparation Of Monitor Viewing Apertures In A Work Station"; and U.S. Pat. No. 6,293,962 patented Sep. 25, 2001 to J. M. Bishay and assigned to Agilent Technologies, INc. on a "Method For Maintaining Environmental Conditions For A Medical Device"; and U.S. Pat. No. 6,229,707 patented May 8, 2001 to J. J. Keenan et al and assigned to Hendry mechanical Works on "Calamity-Proof Electrical Equipment Cabinet Door Systems"; and U.S. Pat. No. 6,329,907 patented to C. W. Uischner et al on Dec. 11, 2001 on an "Emergency Power System For Traffic Control Signals"; and U.S. Pat. No. 6,331,761 patented Dec. 18, 2001 to Y. Kumar et al and assigned to Stryker Corporation on a "Battery Charger Capable Of Evaluating Battery Charge State Based On The Charging History Of The Battery".

SUMMARY OF THE INVENTION

The present invention provides a uniquely novel enclosure designed for the specific purpose of holding one or more electrical devices therein while at the same time providing limited access thereto for servicing or other maintenance. Such electrical devices could comprise battery chargers or computers or any conceivable electrical device which might include exposed contacts or electrical components which would present a possibility of exposing of servicing or maintenance personnel to unwanted levels of voltage and/or electrical current.

The limited accessing construction of the enclosure of the present invention is designed to extend across an access opening defined in the housing of the enclosure. The housing preferably defines a housing chamber which is adapted to receive the electrical device mounted therewithin. The access opening provides access normally to the rear portion of the housing and thus to the rear portion of the electrical device.

In the preferred configuration the access opening of the housing includes a recessed ledge extending along at least a portion of the periphery thereof which is recessed into the housing chamber to facilitate opening and closing of access to the opening.

The overall configuration of the limited accessing construction includes an interior panel which is preferably detachable with respect to the housing such that it can extend over the access opening for limiting access therethrough to the electrical device positioned therein. The interior panel preferably is movable between an interior closed position extending over the access opening and an interior opened position positioned spatially distant from the access opening and thus not closing same.

The interior panel preferably defines an interior accessing aperture for facilitating limited localized access through the interior panel to an electrical device positioned within the housing chamber. This interior panel is preferably formed of a transparent material such as a thermoplastic material such as an acrylic or the like to facilitate safe viewing of the entire electrical device position within the housing chamber whenever the interior panel is in the interior closed position. The interior panel also preferably includes informational indicia positioned thereon such as wiring diagrams, servicing instructions and other important parameters useful to maintenance personnel. This informational indicia is preferably displayed on the interior panel in a convenient and easily viewable location.

The limiting accessing construction also preferably includes an exterior panel which is preferably formed of an opaque material which is detachably secured with respect to the housing and extends over and across the interior panel and over and across the access opening itself. In this manner the exterior panel will further restrict access to an electrical device positioned within the housing chamber above and beyond that protection already provided by the interior panel. It also restricts access to the interior panel itself which is located therebeneath. The exterior panel is preferably movable between an exterior closed position extending over the access opening and an exterior opened position pivoted away from the access opening.

The exterior panel also preferably defines an exterior access aperture for facilitating limited localized access therethrough to the interior panel and to an electrical device positioned within the housing chamber. The interior access aperture and the exterior access aperture are preferably positioned adjacent to one another and in registration with respect to one another to facilitate simultaneous access therethrough in order to facilitate access to the electrical device located in the housing from a location outside of the housing to facilitate access thereto by servicing and maintenance personnel.

An interior securement device may also be adapted to detachably secure the interior panel with respect to the recessed ledge of the housing for the purpose of facilitating complete disengagement therebetween as needed. The interior securement device preferably includes a plurality of screws positionable extending through the interior panel and engageable with respect to the recessed ledge for the purpose of facilitating detachable securement of the interior panel with respect to the housing as desired.

Similarly an exterior securement mechanism may be included such as a hinge which is adopted to pivotally secure the exterior panel with respect to the housing adjacent the access opening thereof to allow pivotal movement thereof between an exterior open position remotely located therefrom and an exterior closed position extending across the access opening itself. A peripheral lip may also be included secured with respect to the exterior panel about the exterior access aperture thereof and extending inwardly therefrom through the interior access aperture of the interior panel. In this manner the peripheral lip will extend into the housing chamber whenever the interior panel is in the interior closed position and the exterior panel is in the exterior closed position to facilitate access therethrough to an electrical device positioned within the housing chamber. The peripheral lip also will prevent items from falling between the interior panel and the exterior panel such as small servicing parts such as screws, screwdrivers, clips or other similar items and will also prevent injury to the user since the sharp corners of the edges of the interior access aperture and exterior access aperture will be hidden beneath the peripheral lip. This peripheral lip will also facilitate the maintenance of proper registration between the interior access aperture of the interior panel and the exterior access aperture of the exterior panel to further facilitate maintenance and servicing of an electrical device positioned within the housing chamber of the enclosure of the present invention.

It is an object of the present invention to provide an enclosure including a housing for holding an electrical device within a chamber defined therein which includes a limited accessing construction for facilitating limited access thereinto by maintenance and servicing personnel.

It is an object of the present invention to provide an enclosure including a housing for holding an electrical device within a chamber defined therein wherein two separately movable safety panels each are movably positioned selectively extendable across the housing access opening.

It is an object of the present invention to provide an enclosure including a housing for holding an electrical device within a chamber defined therein wherein an interior safety panel is utilized which is preferably made of a transparent thermoplastic material such as an acrylic.

It is an object of the present invention to provide an enclosure including a housing for holding an electrical device within a chamber defined therein wherein an interior panel is utilized which includes indicia thereon and other instructional materials such as settings, wiring diagrams and other servicing instructions.

It is an object of the present invention to provide an enclosure including a housing for holding an electrical device within a chamber defined therein wherein an exterior panel is positioned separably movable across the access opening positioned adjacent and outside of an interior panel.

It is an object of the present invention to provide an enclosure including a housing for holding an electrical device within a chamber defined therein wherein the exterior panel is of a metallic opaque material.

It is an object of the present invention to provide an enclosure including a housing for holding an electrical device within a chamber defined therein wherein the exterior panel is secured to the housing by a hinge.

It is an object of the present invention to provide an enclosure including a housing for holding an electrical device within a chamber defined therein wherein the interior panel is completely disengageable with respect to the opening and is secured thereto by conventional screw means.

It is an object of the present invention to provide an enclosure including a housing for holding an electrical device within a chamber defined therein wherein the interior panel and the exterior panel each define access apertures therethrough which are in registration with respect to one another to facilitate limited access to certain areas of the electrical device positioned within the housing.

It is an object of the present invention to provide an enclosure including a housing for holding an electrical device within a chamber defined therein wherein a peripheral lip is included secured to the external panel which extends through the external access aperture and the internal access aperture to facilitate reaching through these two apertures for servicing in localized areas of the portion of the electrical device positioned thereadjacent.

It is an object of the present invention to provide an enclosure including a housing for holding an electrical device within a chamber defined therein wherein said housing defines a recessed ledge along a portion of the access opening to facilitate mounting of a transparent interior panel with respect to the housing and allow complete disengagement therebetween.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 6 is a plan view of the lower portion of the informational indicia of FIG. 4.

DETAILED DESCRIPTION OF THE PREFERRED EMBODIMENT

Figure 1:
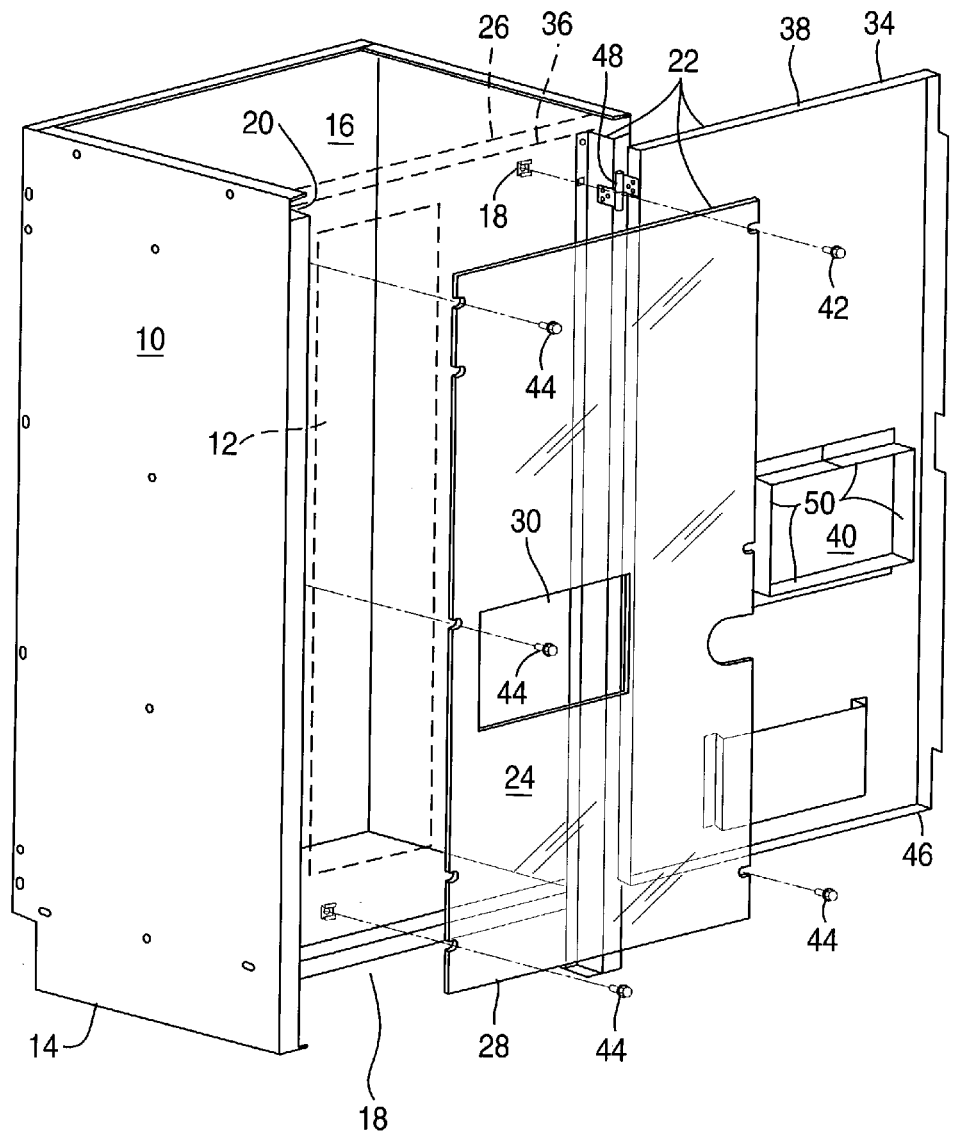
FIG. 1 is a perspective illustration of an embodiment of the enclosure of the present invention.
Figure 2:
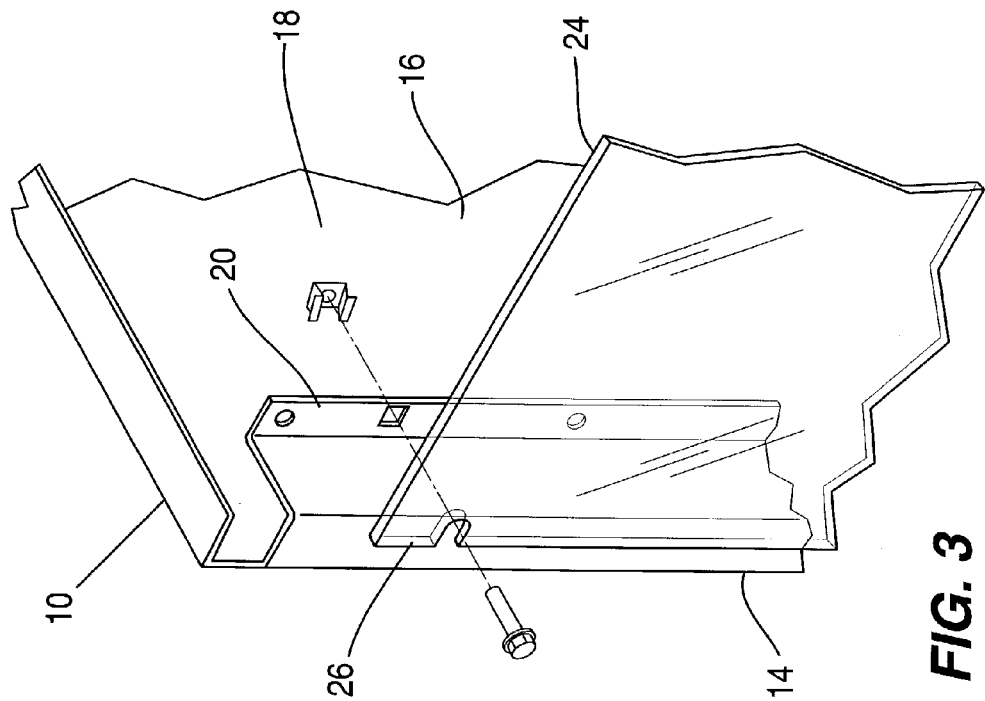
FIG. 2 is a detailed view of the configuration shown in FIG. 1 viewing the upper righthand corner thereof.
Figure 3:
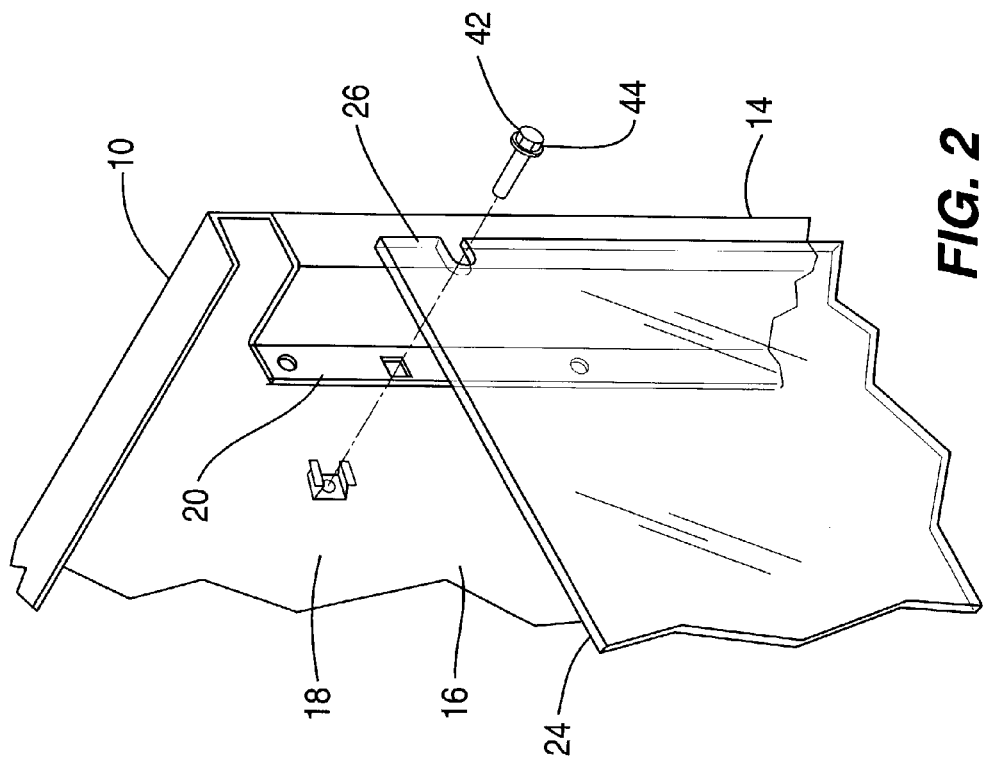
FIG. 3 is a detailed view of the upper lefthand corner of the embodiment shown in FIG. 1.
Figure 4:
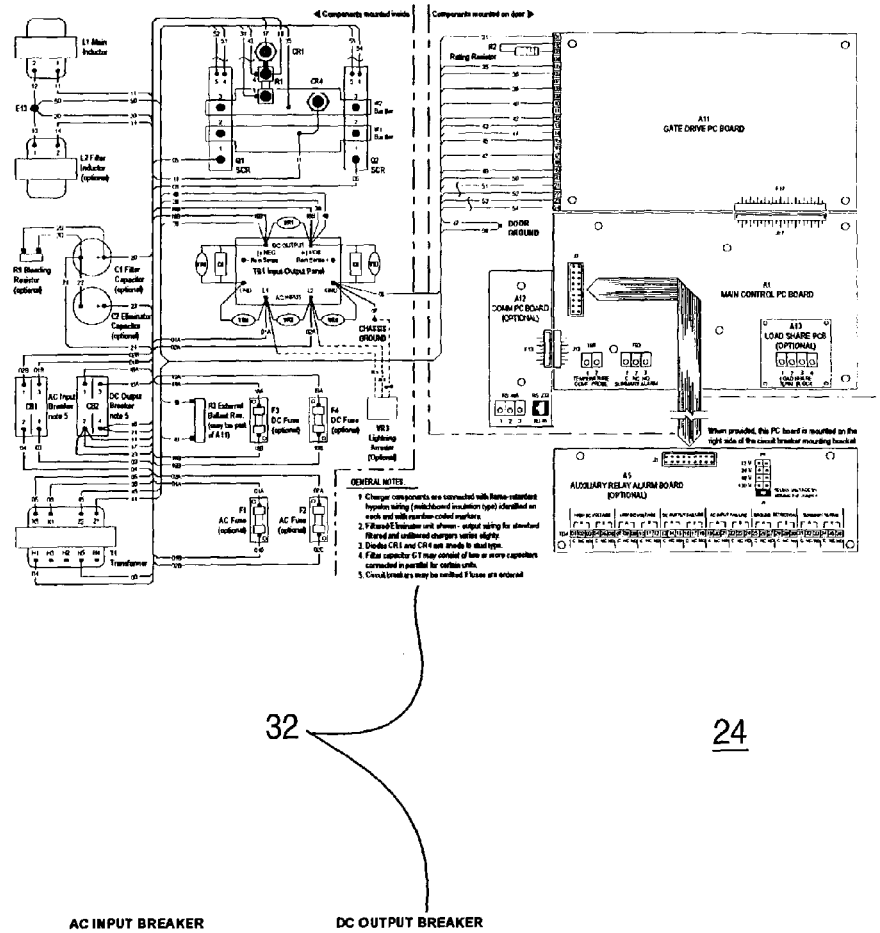
FIG. 4 is a front plan view of the interior panel informational indicia of an embodiment of the present invention.
Figure 5:
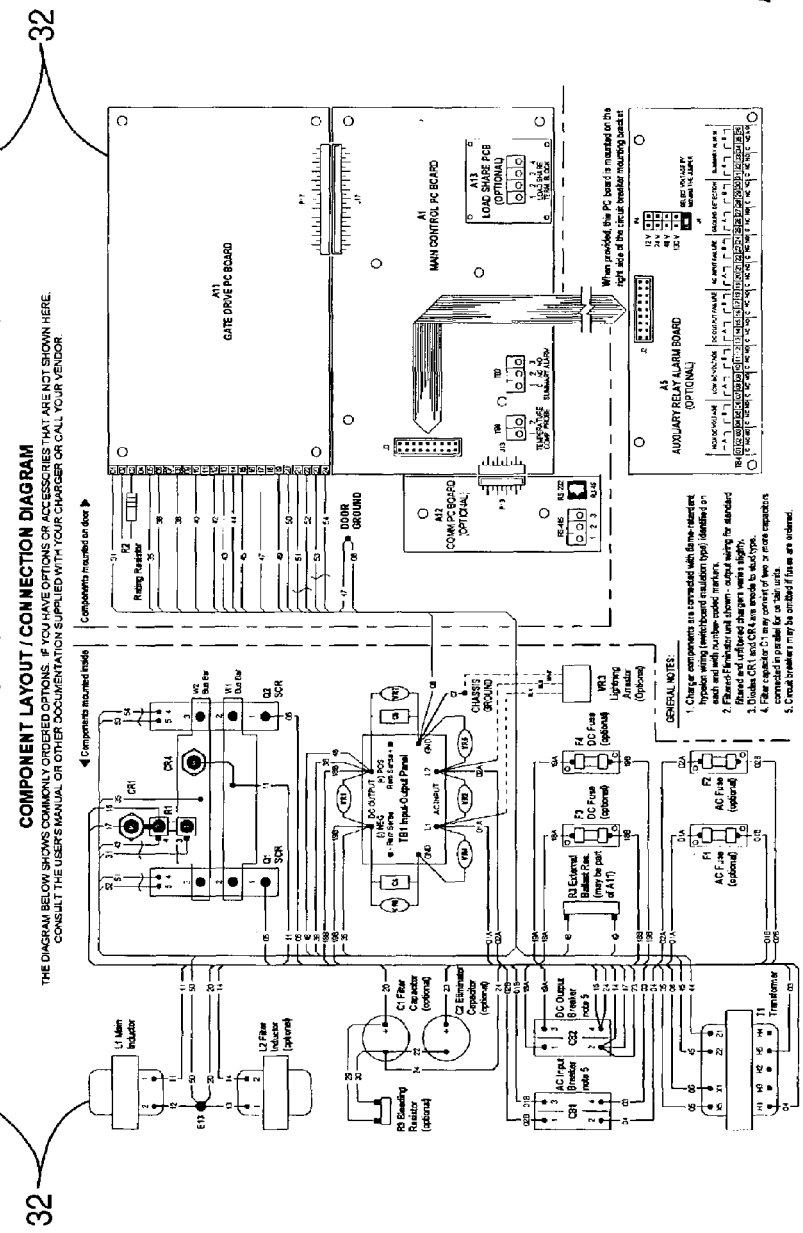
FIG. 5 is a close-up view of the upper portion of the indicia shown in FIG. 4.

The present invention provides a uniquely configured enclosure which is designed specifically for the purpose of holding and retaining an electrical device positioned therewithin and providing limited access thereto. The enclosure 10 preferably includes a housing 14 which defines a housing chamber 16 therewithin for holding of the electrical device 12.

The housing 14 defines an access opening 18 therein for the purpose of providing access into the housing chamber 16 so that maintenance or servicing personnel can readily view and service such electrical devices 12. The electrical device can be of many different configurations but is particularly usable for servicing high voltage and high current flow devices such as power supplies and high capacity industrial battery charging systems. These devices make use of high voltage and high current flow devices and, as such, are particularly adaptable to the protective aspects of the dual panel safety enclosure device of the present invention.

Normally access to the electrical device 12 will be made through an access opening 18 positioned normally in the back portion of the housing 14. This access opening 18 in the construction of the present invention will include a limited accessing construction 22 extending thereover. This limited accessing construction 22 preferably includes an interior panel 24 recessed within the enclosure 10 and detachably capable of being mounted with respect to a recessed ledge 20. This ledge 20 is preferably positioned adjacent to the access opening 18 but is recessed into the chamber 16 of the housing 14. In the preferred configuration of this embodiment the interior panel 24 includes an interior securement means 42 which preferably takes the form of a plurality of screws 44 which can extend through holes or slots defined in the interior panel 24 for detachably securing of this panel with respect to the recessed ledge 20. In this manner when the interior panel 24 is secured in position to the recessed ledge 20 by the screws 44 it will be in the interior closed position 26. If full access is required for servicing of the electrical device 12 the interior panel 24 can be removed by the disengagement of the interior securement means 42 or screws 44 from the recessed ledge 20 thereby allowing the interior panel 24 to be removed from its position extending across the access opening 18 such that it can be moved to an interior opened position 28 remotely located from the access opening 18. In the preferred configuration of the present invention the interior panel 24 will be formed of an at least partially translucent or preferably transparent material such as a thermoplastic resin to facilitate viewing therethrough and allow observation of the entire electrical device 12 while restricting access thereto. In some configurations of the present invention limited access to the electrical device 12 positioned within the enclosure 10 is provided by the defining of an interior access aperture 30 in the interior panel 24 and in this manner allow limited localized physical contact between maintenance personnel with respect to very limited portions of the electrical device 12 located within the housing 14 for the purpose of servicing thereof.

To further facilitate servicing informational indicia 32 can be displayed upon the interior panel 24 in a manner such that it is conveniently accessible and readily viewable by servicing personnel simultaneously with accessing of the electrical device 12 through the access opening 18 of the housing 14. This informational indicia 32 can include many different types of information such as wiring diagrams, circuit diagrams, parameter settings, component identifying numbers and other specific information particularly pertinent and extremely useful to such servicing personnel.

To further facilitate limited access to the electrical device 12 within enclosure 10, an exterior panel 34 is preferably included. This exterior panel 34 preferably is movable between an exterior closed position 36 extending across the access opening 18 and across the outer surface of the interior panel 24 and an exterior opened position 38 located remotely therefrom. Movement between the closed position 36 and the opened position 38 by the exterior panel 34 is facilitated by an exterior securement means 46 such as a hinge 48 which allows pivotal movement of the exterior panel 34 respectively between the exterior opened position 38 and the exterior closed position 36.

In certain configurations of the present invention the exterior panel 34 will define an exterior access aperture 40 to facilitate limited localized access therethrough. In the preferred configuration of the present invention the exterior access aperture 40 if defined in the exterior panel 34 will be adjacent and in registration with respect to the interior access aperture 30 of the interior panel 24 and in this manner provide direct localized access to a limited specific area of the electrical device 12 to facilitate servicing thereof while minimizing the possibility of physical contact with respect to the more dangerous high voltage or high current flow areas of the device.

To further facilitate coordinated usage of the exterior access aperture 40 and the interior access aperture 30 registered therewith a peripheral lip means 50 may be included secured to the exterior panel 34 around the exterior access aperture 40 thereof. This peripheral lip means 50 can extend inwardly from the exterior access aperture 40 of exterior panel 34 through the interior access aperture 30 of the interior panel 24 in such a manner as to penetrate into the housing chamber 16 to a limited extent. As shown best in FIG. 1 this device will then facilitate comfort to servicing personnel when reaching through the registered apertures 30 and 40 and will prevent items from falling in the narrow area between the interior panel 24 and the exterior panel 34. Also it will prevent sharp edges or corners of the interior panel 24 and the exterior panel 34 from contacting the hands or tools of servicing personnel and increase comfort when performing such maintenance activities. Also the peripheral lip means 50 will facilitate and enhance the horizontal registration between the interior access aperture 30 of interior panel 24 and the exterior access aperture 40 of the exterior panel 34.

It is important to appreciate that the combination of usages of the interior and exterior panel of the present invention provides an overall synergism which is extremely advantageous to servicing personnel. The forming of the interior panel preferably of a transparent material allows the servicing person to see all areas of the electrical device 12 while having only limited access to those areas thereof immediately adjacent to the interior access aperture 30. Thus limited access but full viewability is provided. Also the informational indicia readily provides important information to the servicing personnel which is immediately at hand and easily viewable without requiring the use of any external reference source for providing this important required information for all servicing. At the same time the present invention provides a double paneled protection system for preventing the exposure of servicing personnel and other maintenance individuals to unduly high voltage and high current devices and contacts since such areas are designed to be located distant from the interior access aperture and thus unable to be touched or accidentally contacted in any fashion by the servicing person. This is a combination not shown or suggested in any prior art of which the applicant is aware and, as such, the present invention provides this for the first time in a novel combination.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An enclosure means for holding an electrical device having a limited accessing construction with dual panels for safely providing limited access thereinto for servicing, said enclosure means comprising:
    A. a housing means defining a housing chamber means adapted to receive an electrical device positioned therewithin, said housing means defining an access opening means therein to facilitate access to the electrical device positioned therein for servicing;
    B. a limited accessing construction affixable movably with respect to said housing means adjacent said opening means and being positionable extending over and across said access opening means for controlling access therethrough to the electrical device positioned within said housing chamber means, said limited accessing construction comprising;
        (1) an interior panel means detachably securable with respect to said housing means and extending over said access opening means for limiting access through said access opening means to an electrical device positioned therewithin, said interior panel means being movable between an interior closed position extending over said access opening means and an interior opened position not extending over said access opening means, said interior panel means defining an interior access aperture means for facilitating limited localized access through said interior panel means to an electrical device positioned within said housing chamber means;
        (2) a exterior panel means detachably securable with respect to said housing means and extending over and across said interior panel means and over and across said access opening means for further restricting access to an electrical device positioned within said housing chamber means and for restricting access to said interior panel means located therebehind, said exterior panel means being movable between an exterior closed position extending over said access opening means and an exterior opened position not extending over said access opening means, said exterior panel means defining an exterior access aperture means for facilitating limited localized access therethrough to said interior panel means and to an electrical device positioned within said housing chamber means, said interior access aperture means and said exterior access aperture means being adjacently positioned to facilitate simultaneous access therethrough in order to allow access to the electrical device positioned within said housing chamber means from outside of said housing means, said interior access aperture means and said exterior access aperture means also being in registration with respect to one another responsive to said interior panel means being in the interior closed position and said exterior panel means being in the exterior closed position to further facilitate localized access to the electrical device positioned within said housing chamber means from outside of said housing means; and
        (3) a peripheral lip means secured with respect to said exterior panel means around said exterior access aperture means thereof and extending inwardly therefrom through said interior access aperture means of said interior panel means into said housing chamber means responsive to said interior panel means being in the interior closed position and said exterior panel means being in the exterior closed position to facilitate access therethrough to an electrical device positioned within said housing chamber means.

2. An enclosure means for holding an electrical device having a limited accessing construction with dual panels for safely providing limited access thereinto for servicing as defined in claim 1 wherein said interior panel means is at least partially transparent to facilitate safe viewing of an electrical device positioned within said housing chamber means responsive to said exterior panel means being in the exterior open position and said interior panel means being in the interior closed position.

3. An enclosure means for holding an electrical device having a limited accessing construction with dual panels for safely providing limited access thereinto for servicing as defined in claim 1 wherein said interior panel means includes informational indicia means positioned thereupon to provide servicing guidance and instructions to personnel servicing an electrical device through said access opening means of said housing means.

4. An enclosure means for holding an electrical device having a limited accessing construction with dual panels for safely providing limited access thereinto for servicing as defined in claim 3 wherein said interior panel means defines an interior access aperture means for facilitating limited localized access through said interior panel means to an electrical device positioned within said housing chamber means while simultaneously viewing of said informational indicia means positioned thereupon.

5. An enclosure means for holding an electrical device having a limited accessing construction with dual panels for safely providing limited access thereinto for servicing as defined in claim 1 wherein said limited accessing construction including an interior securement means adapted to detachably secure said interior panel means with respect to said housing means and to allow complete disengagement therebetween.

6. An enclosure means for holding an electrical device having a limited accessing construction with dual panels for safely providing limited access thereinto for servicing as defined in claim 5 wherein said housing means includes a recessed ledge means extending along at least a portion of the periphery of said access opening means and adapted to receive said interior securement means detachably secured with respect thereto to facilitate detachable securement of said interior panel means with respect to said housing extending over and across said access opening means.

7. An enclosure means for holding an electrical device having a limited accessing construction with dual panels for safely providing limited access thereinto for servicing as defined in claim 6 wherein said recessed ledge means is recessed within said housing chamber means to facilitate positioning of said exterior panel means in the exterior closed position extending thereover and immediately thereadjacent.

8. An enclosure means for holding an electrical device having a limited accessing construction with dual panels for safely providing limited access thereinto for servicing as defined in claim 6 wherein said interior securement means includes plurality of screws positionable extending through said interior panel means and engageable with respect to said recessed ledge means to facilitate detachable securement of said interior panel means with respect to said housing means selectively.

9. An enclosure means for holding an electrical device having a limited accessing construction with dual panels for safely providing limited access thereinto for servicing as defined in claim 1 wherein said limited accessing construction including an exterior securement means adapted to pivotally secure said exterior panel means with respect to said housing means adjacent said access opening means thereof to allow pivotal movement thereof between the exterior opened position and the exterior closed position.

10. An enclosure means for holding with dual panels for safely providing limited access thereinto for servicing an electrical device having a limited accessing construction as defined in claim 9 wherein said exterior securement means comprises a hinge means.

11. An enclosure means for holding an electrical device having a limited accessing construction with dual panels for safely providing limited access thereinto for servicing as defined in claim 1 wherein said interior panel means is made of a transparent plexiglas material.

12. An enclosure means for holding an electrical device having a limited accessing construction with dual panels for safely providing limited access thereinto for servicing as defined in claim 1 wherein said interior panel means and said exterior panel means each extend completely over said access opening means to prevent access therethrough to an electrical device positioned within said housing chamber means.

13. An enclosure means for holding an electrical device having a limited accessing construction with dual panels for safely providing limited access thereinto for servicing as defined in claim 1 wherein said interior panel means is made of a transparent thermoplastic material and said exterior panel means is made of an opaque metallic material.

14. An enclosure means for holding an electrical device having a limited accessing construction with dual panels for safely providing limited access thereinto for servicing, said enclosure means comprising:
  A. a housing means defining a housing chamber means adapted to receive an electrical device positioned therewithin, said housing means defining an access opening means therein to facilitate access to the electrical device positioned therein for servicing;
  B. a limited accessing construction affixable movably with respect to said housing means adjacent said opening means and being positionable extending over and across said access opening means for controlling access therethrough to the electrical device positioned within said housing chamber means, said limited accessing construction comprising;
    (1) an interior panel means detachably securable with respect to said housing means and extending over said access opening means for limiting access through said access opening means to an electrical device positioned therewithin, said interior panel means being movable between an interior closed position extending over said access opening means and an interior opened position not extending over said access opening means, said interior panel means defining an interior access aperture means for facilitating limited localized access through said interior panel means to an electrical device positioned within said housing chamber means, said interior panel means being at least partially transparent to facilitate safe viewing of an electrical device positioned within said housing chamber means responsive to said interior panel means being in the interior closed position;
    (2) a exterior panel means detachably securable with respect to said housing means and extending over and across said interior panel means and over and across said access opening means for further restricting access to an electrical device positioned within said housing chamber means and for restricting access to said interior panel means located therebehind, said exterior panel means being movable between an exterior closed position extending over said access opening means and an exterior opened position not extending over said access opening means, said exterior panel means defining an exterior access aperture means for facilitating limited localized access therethrough to said interior panel means and to an electrical device positioned within said housing chamber means, said interior access aperture means and said exterior access aperture means being adjacently positioned to facilitate simultaneous access therethrough in order to facilitate access to the electrical device positioned within said housing chamber means from outside of said housing means;
    (3) an interior securement means adapted to detachably secure said interior panel means with respect to said housing means and to allow complete disengagement therebetween; and
    (4) an exterior securement means adapted to pivotally secure said exterior panel means with respect to said housing means adjacent said access opening means thereof to allow pivotal movement thereof between the exterior opened position and the exterior closed position.

15. An enclosure means for holding an electrical device having a limited accessing construction with dual panels for safely providing limited access thereinto for servicing, said enclosure means comprising:
  A. a housing means defining a housing chamber means adapted to receive an electrical device positioned therewithin, said housing means defining an access opening means therein to facilitate access to the electrical device positioned therein for servicing, said housing means including a recessed ledge means extending along at least a portion of the periphery of said access opening means and being recessed within said housing chamber means;
  B. a limited accessing construction affixable movably with respect to said housing means adjacent said opening means and being positionable extending over and across said access opening means for controlling access therethrough to the electrical device positioned within said housing chamber means, said limited accessing construction comprising;
    (1) an interior panel means detachably securable with respect to said housing means and extending over said access opening means for limiting access through said access opening means to an electrical device positioned therewithin, said interior panel means being movable between an interior closed position extending over said access opening means and an interior opened position not extending over said access opening means, said interior panel means defining an interior access aperture means for facilitating limited localized access through said interior panel means to an electrical device positioned within said housing chamber means, said interior panel means being of transparent thermoplastic material to facilitate safe viewing of an electrical device positioned within said housing chamber means responsive to said interior panel means being in the interior closed position, said interior panel means including informational indicia means positioned thereupon to provide servicing guidance and instructions to personnel servicing an electrical device through said access opening means of said housing means;

(2) a exterior panel means of opaque metallic material detachably securable with respect to said housing means and extending over and across said interior panel means and over and across said access opening means for further restricting access to an electrical device positioned within said housing chamber means and for restricting access to said interior panel means located therebehind, said exterior panel means being movable between an exterior closed position extending over said access opening means and an exterior opened position not extending over said access opening means, said exterior panel means defining an exterior access aperture means for facilitating limited localized access therethrough to said interior panel means and to an electrical device positioned within said housing chamber means, said interior access aperture means and said exterior access aperture means being adjacently positioned and in registration with respect to one another in order to facilitate simultaneous access therethrough in order to facilitate access to the electrical device positioned within said housing chamber means from outside of said housing means;

(3) an interior securement means adapted to detachably secure said interior panel means with respect to said recessed ledge means of said housing means for facilitating complete disengagement therebetween selectively, said interior securement means includes plurality of screws positionable extending through said interior panel means and engageable with respect to said recessed ledge means to facilitate detachable securement of said interior panel means with respect to said housing means selectively;

(4) an exterior securement means comprising a hinge means adapted to pivotally secure said exterior panel means with respect to said housing means adjacent said access opening means thereof to allow pivotal movement thereof between the exterior opened position and the exterior closed position; and (5) a peripheral lip means secured with respect to said exterior panel means around said exterior access aperture means thereof and extending inwardly therefrom through said interior access aperture means of said interior panel means into said housing chamber means responsive to said interior panel means being in the interior closed position and said exterior panel means being in the exterior closed position to facilitate access therethrough to an electrical device positioned within said housing chamber means.

16. An enclosure means for holding an electrical device having a limited accessing construction with dual panels for safely providing limited access thereinto for servicing, said enclosure means comprising:

A. a housing means defining a housing chamber means adapted to receive an electrical device positioned therewithin, said housing means defining an access opening means therein to facilitate access to the electrical device positioned therein for servicing, said housing means further including a recessed ledge means extending along at least a portion of the periphery of said access opening means;

B. a limited accessing construction affixable movably with respect to said housing means adjacent said opening means and being positionable extending over and across said access opening means for controlling access therethrough to the electrical device positioned within said housing chamber means, said limited accessing construction comprising;

(1) an interior panel means detachably securable with respect to said housing means and extending over said access opening means for limiting access through said access opening means to an electrical device positioned therewithin, said interior panel means being movable between an interior closed position extending over said access opening means and an interior opened position not extending over said access opening means; and (2) an exterior panel means detachably securable with respect to said housing means and extending over and across said interior panel means and over and across said access opening means for further restricting access to an electrical device positioned within said housing chamber means and for restricting access to said interior panel means located therebehind, said exterior panel means being movable between an exterior closed position extending over said access opening means and an exterior opened position not extending over said access opening means;

(3) an interior securement means adapted to detachably secure said interior panel means with respect to said housing means and to allow complete disengagement therebetween, said interior securement means adapted to be detachably securable with respect to said recessed ledge means to facilitate detachable securement of said interior panel means with respect to said housing extending over and across said access opening means.

17. An enclosure means for holding an electrical device having a limited accessing construction with dual panels for safely providing limited access thereinto for servicing as defined in claim 16 wherein said recessed ledge means is recessed within said housing chamber means to facilitate positioning of said exterior panel means in the exterior closed position extending thereover and immediately thereadjacent.

18. An enclosure means for holding an electrical device having a limited accessing construction with dual panels for safely providing limited access thereinto for servicing as defined in claim 16 wherein said interior securement means includes plurality of screws positionable extending through said interior panel means and engageable with respect to said recessed ledge means to facilitate detachable securement of said interior panel means with respect to said housing means selectively.

* * * * *